Sept. 29, 1953 W. L. OSLUND 2,653,403
FISH NET
Filed March 5, 1952
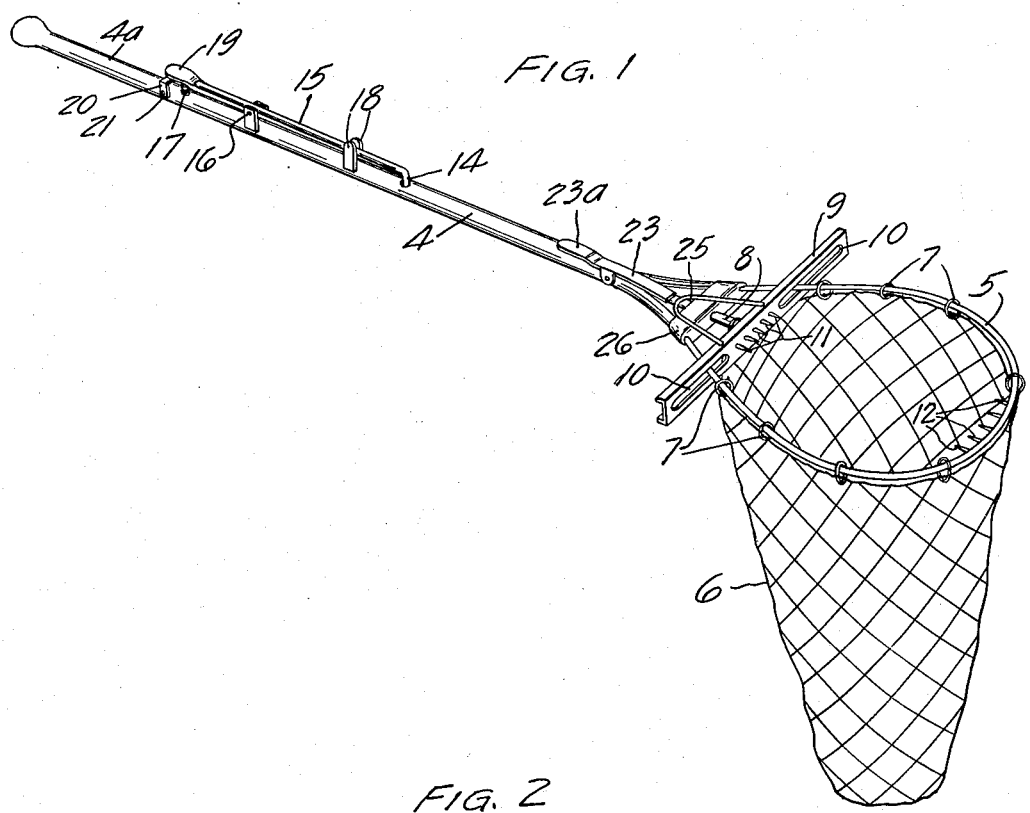
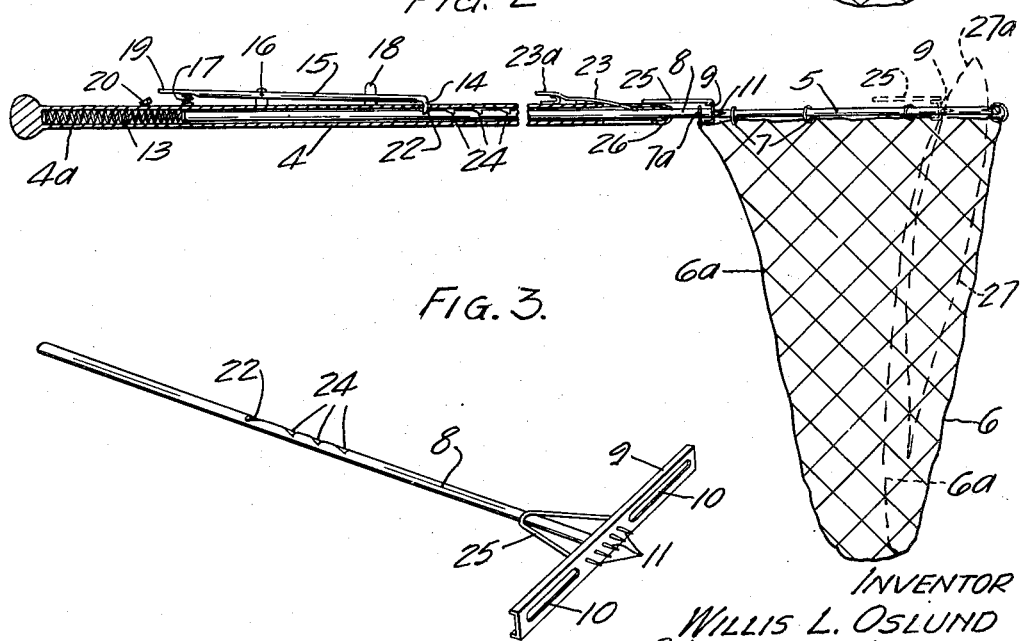
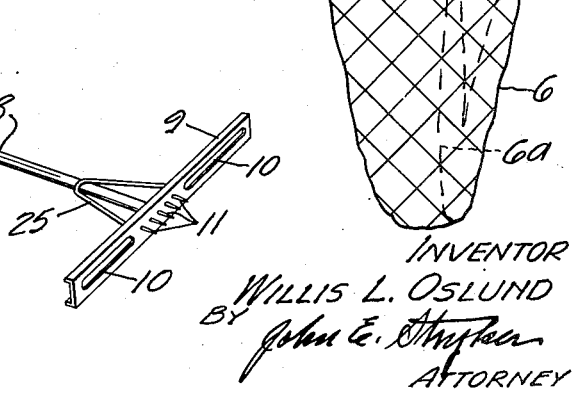
INVENTOR
WILLIS L. OSLUND
BY
ATTORNEY Patented Sept. 29, 1953

2,653,403

UNITED STATES PATENT OFFICE 2,653,403

FISH NET

Willis L. Oslund, Forest Lake, Minn.

Application March 5, 1952, Serial No. 274,890

10 Claims. (Cl. 43—11)

This invention relates to a fish net structure of the hand operated type known as a dip net or landing net, and particularly to novel mechanism for closing the normally open top of such a net instantaneously to prevent the escape of fish which have been gathered in the net.

It is an object of my invention to provide novel spring actuated mechanism under control of a latch located on the handle of the device for gathering the normally open top of the mesh bag from open to closed position instantaneously.

A particular object is to slidably mount the open end portion of the mesh bag on a supporting frame or loop member in such a manner as to permit the closing of the mesh bag by sliding it along opposite sides of the supporting member to a third side thereof and to provide coacting spring actuated gathering mechanism which slides along opposite sides of the supporting member to gather and close the mesh bag.

The invention also includes certain other novel features of construction which will be more fully described in the following specification and claims.

Referring to the accompanying drawing, which illustrates by way of example and not for the purpose of limitation, a preferred embodiment of my invention:

Figure 1 is a perspective view showing my improved fish net structure;

Fig. 2 is a central vertical, longitudinal sectional view of the same, and

Fig. 3 is a perspective view showing the plunger and cross bar for closing the mesh bag.

In the drawing the numeral 4 indicates a tubular handle and the numeral 5 a rigid loop connected to an end of the handle for supporting a mesh bag 6 which is of the common bag shape having a normally open top. The margin of the bag defining the top opening is secured at suitable intervals to rings 7 which embrace the loop 5, being freely slidable along opposite sides thereof. As indicated in Fig. 2, the side of the bag 6 adjacent to the handle 4 is fastened to a ring 7a and this ring embraces a plunger rod 8 having rigidly secured to its outer end a cross bar 9. This cross bar slidably engages opposite lateral sides of the loop 5 and is formed with elongated openings 10 through which the respective sides of the loop pass. The ring 7a and adjacent rings 7 are spaced apart one from another along the margin of the bag a sufficient distance to allow for the guided separation of these rings 7 as they are moved along opposite sides of the loop 5.

Fixed on the front side of the bar 9 are a plurality of teeth 11 arranged to coact with oppositely projecting teeth 12 carried by the loop 5 for the purpose of guarding against the escape of fish from the bag, as hereinafter described.

Within the handle 4 a coiled spring 13 is disposed to engage the plunger rod 8 to bias it toward an extended position in relation to the handle. Latch means for retaining the plunger in retracted position comprise a tooth 14 projecting through an opening in the handle and formed on an end of a latch lever 15. This lever is pivotally supported on a pin 16 carried by bracket members projecting from the handle and a small coiled spring 17 is arranged to bias the lever 15 toward its operative position in which the tooth 14 engages the plunger rod. A pair of rigid fingers 18 project in parallel relation one to another for guiding the toothed end of the lever 15 and an opposite end portion 19 of the lever is adapted to be pressed toward the handle to release the plunger. A safety catch 20 is pivotally connected to the handle 4 by a pin 21 and is movable to the lever locking position shown in Fig. 1 in which it supports the end portion 19 of the lever in its extended or locking position. This safety catch may also be moved to release position, indicated in Fig. 2, wherein the lever 15 is freed so that it may be actuated to compress the spring 17. The handle 4 is preferably formed with a grip portion 4a adjacent to the operative end of the latch lever 15. The tooth 14 extends through an opening in the handle 4 and is formed to engage the plunger rod 8 in a notch 22 formed in the latter so that this rod may be held in its retracted position wherein the spring 13 is fully compressed.

A spring biased dog 23 is fastened to the handle 4 near its junction with the loop 5 for engagement with any one of a series of notches 24 which are formed in the rod 8 for the purpose of locking the plunger 8 and cross bar 9 in selected extended positions. The operator, by pressing on an end portion 23a of the dog 23, releases the extended plunger 8 so that it may be retracted. Manual return of the cross bar 9 from its extended position to its retracted position against the action of the spring 13 is facilitated by providing a U-shaped handle member 25 which is secured to the bar 9 and projects toward the main handle 4. A bearing member 26 is rigidly supported on the loop 5 near its junction with the handle 4 and the plunger rod 8 is slidably guided in a suitable bearing in this member.

During the use of my invention to gather fish into the bag 6, the top or mouth of the bag is held in open position with the cross bar 9 and plunger rod 8 in the positions indicated in Figs. 1 and 2, the spring 13 being held under compression by engagement of the dog 14 in the notch 22 of the rod 8, and the safety catch 20 being retained in the release position shown in Fig. 2. Upon gathering a fish, indicated at 27 in Fig. 2, into the bag, the operator may close it instantaneously merely by pressing on the portion 19 of the lever 15 thereby releasing the plunger 8 and causing the cross bar 9 to be projected toward a closed position, such as that indicated in broken lines in Fig. 2. During this movement the bar 9 gathers the bag by sliding the rings 7 along the lateral sides of the loop 5 toward the side thereof opposite to the handle. It will be evident that the side 6a of the bag is thus moved from the full line position indicated in Fig. 2 to a broken line position such as that indicated therein or to a fully collapsed position in which the bar 9 holds all of the rings 7 in a compact group in contact with the side of the loop 5.

Occasionally a portion of a fish may be projecting from the open top of the bag, e. g., as indicated at 27a in Fig. 2, at the instant the bag is closed. In such cases the teeth 11 and 12 either penetrate or grip the fish with sufficient force to prevent its escape. Secure fastening of the bag in closed position is also insured by the spring-pressed dog 23 which engages an appropriate notch 24 in the plunger rod 2 to lock the bar 9 in its net closing position. This locking mechanism also makes it feasible to provide a spring 13 of minimum suitable length and strength thereby minimizing the force required to move the plunger to its retracted position and at the same time effectively guarding against the opening of the bag as a result of the struggle of a fish to escape. During the removal of fish contained in the bag my net closing mechanism may be held in its retracted position by the use of the safety catch 20 which is merely turned to its position wherein it supports the end portion 19 of the lever 15 in its plunger locking position.

It will be evident that the number and spacing of the slidable rings 7 and details of the bag closing latch and lock mechanism may be varied within the spirit of the appended claims.

Having described my invention, what I claim as new and desire to protect by Letters Patent is:

1. In a net structure having a loop and a handle projecting from one side of said loop the improvements which comprise, a bag suspended from said loop and slidable along opposite sides thereof from an open position to a closed position, spring actuated means operatively connected to said bag for closing it instantly by gathering it at a side of said loop and latch means disposed to retain said spring actuated means in retracted position and said bag in open position.

2. A net structure in accordance with claim 1 having a series of fastening members secured in spaced relation one to the others along the margin of said bag defining the top opening thereof and said fastening members slidably embracing said loop to support the bag thereon, the spacing of the fastening members along one side of said margin being sufficient to permit the movement of the corresponding side of the bag to closed position in contact with the opposite side of the bag.

3. In a net structure having a loop and a hollow handle projecting from one side of said loop in substantially coplanar relation to the loop, a bag suspended from said loop and slidable thereon from an open position to a closed position at the side thereof remote from said handle, a spring actuated plunger contained in said handle, means operatively connecting said plunger to said bag for closing it instantly by gathering it at the side of said loop remote from said handle and latch means carried by said handle and operative to retain said spring actuated plunger in retracted position and said bag in open position.

4. In a net structure having a loop and a hollow handle projecting from one side of said loop in substantially coplanar relation to said loop, a bag suspended from said loop and slidable thereon from an open position to a closed position at a side thereof, a spring actuated plunger contained in said handle, means operatively connecting said plunger to said bag for sliding it along opposite sides of said loop to a closed position and a latch carried by said handle and operative to retain said plunger in retracted position and said bag in open position.

5. A net structure comprising, a loop, a bag having an open end portion suspended from said loop and slidable thereon to a closed position at one side thereof, a hollow supporting handle projecting from the opposite side of said loop, a spring actuated plunger movable longitudinally in said handle and projecting substantially in the plane of said loop and a cross bar operatively connected to said plunger, extending substantially at right angles thereto and slidable in engagement with said loop from a position adjacent to said handle to a position near the opposite side of the loop, said bag being operatively connected to said cross bar whereby the bag may be gathered in closed position at one side of said loop.

6. A net structure in accordance with claim 5 wherein a plurality of teeth are carried by said cross bar and disposed to project into the opening in the bag and thereby guard against the escape of fish from the bag when the latter is gathered in closed position.

7. A net structure in accordance with claim 5 wherein a plurality of teeth are carried by said loop and disposed to project toward said cross bar whereby to guard against the escape of fish from the bag when the latter is gathered in closed position.

8. A net structure in accordance with claim 5 wherein a plurality of teeth are carried by said cross bar and disposed to project into the opening in the bag and coacting teeth are carried by said loop and disposed to project therefrom toward the teeth carried by said bar whereby to guard against the escape of fish from the bag when the latter is gathered in closed position.

9. A net structure in accordance with claim 5 wherein a latch is carried by said handle and disposed to engage said plunger to retain it in retracted position against the bias of said spring whereby the bag may be held in open position, said latch being manually operable to release the plunger for closing the bag.

10. A net structure in accordance with claim 5 wherein a detent is carried by said handle and teeth are formed on said plunger to be engaged by said detent to lock the plunger in extended position.

WILLIS L. OSLUND.

References Cited in the file of this patent

UNITED STATES PATENTS

| Number | Name | Date |
|---|---|---|
| 2,124,952 | Norris et al. | July 26, 1938 |

FOREIGN PATENTS

| Number | Country | Date |
|---|---|---|
| 598,315 | Great Britain | Feb. 16, 1948 |